Patented Nov. 5, 1946

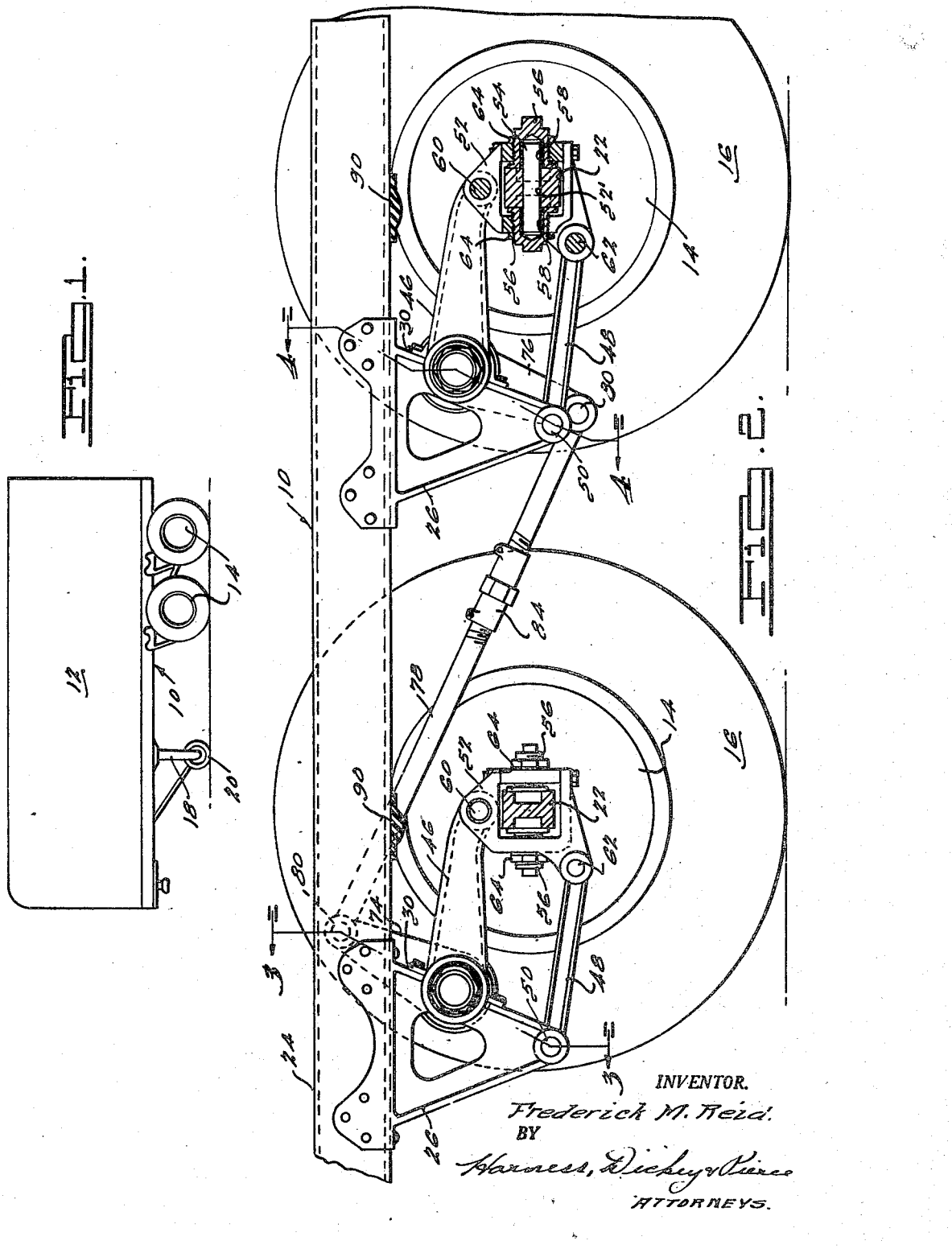

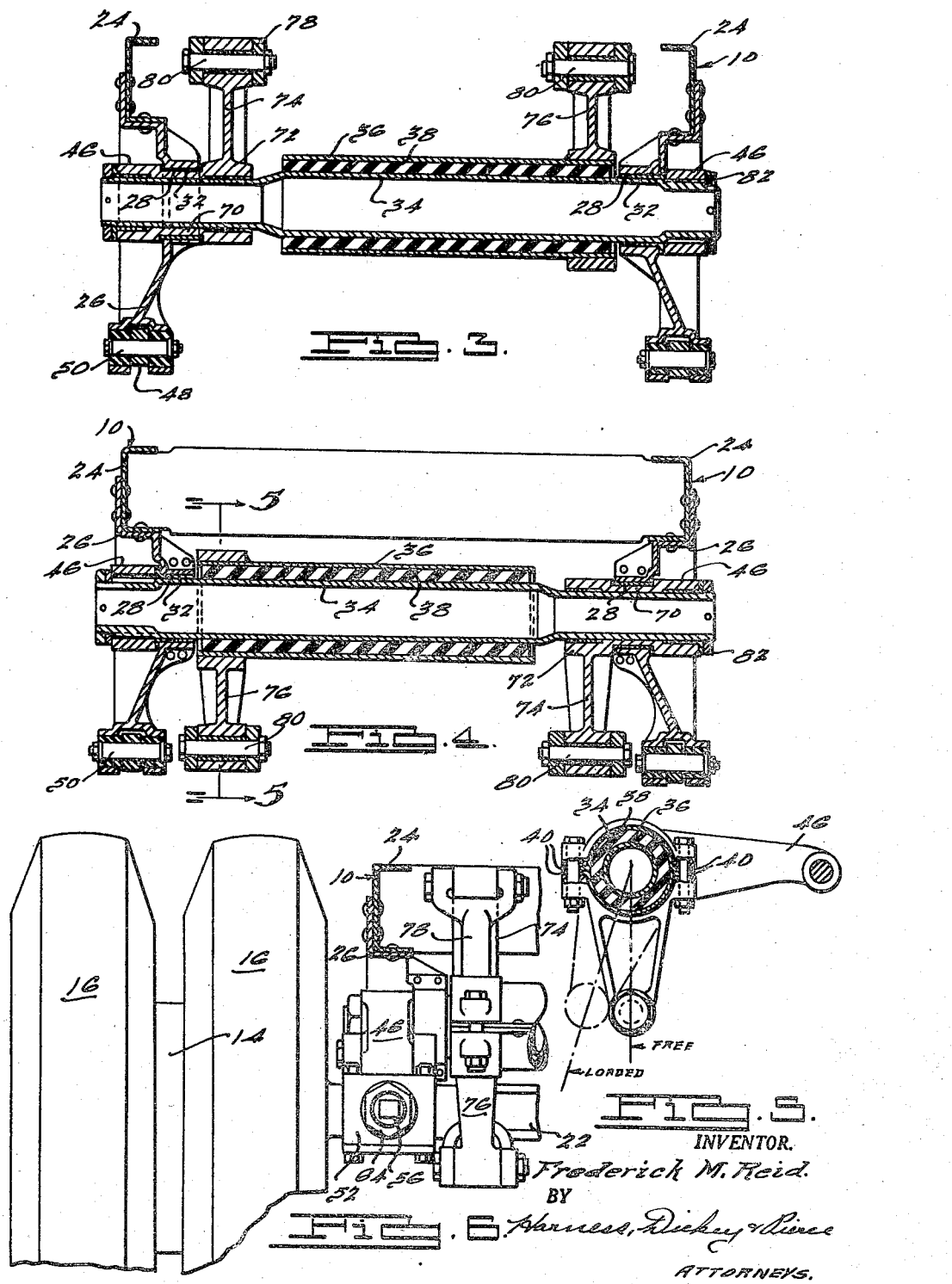

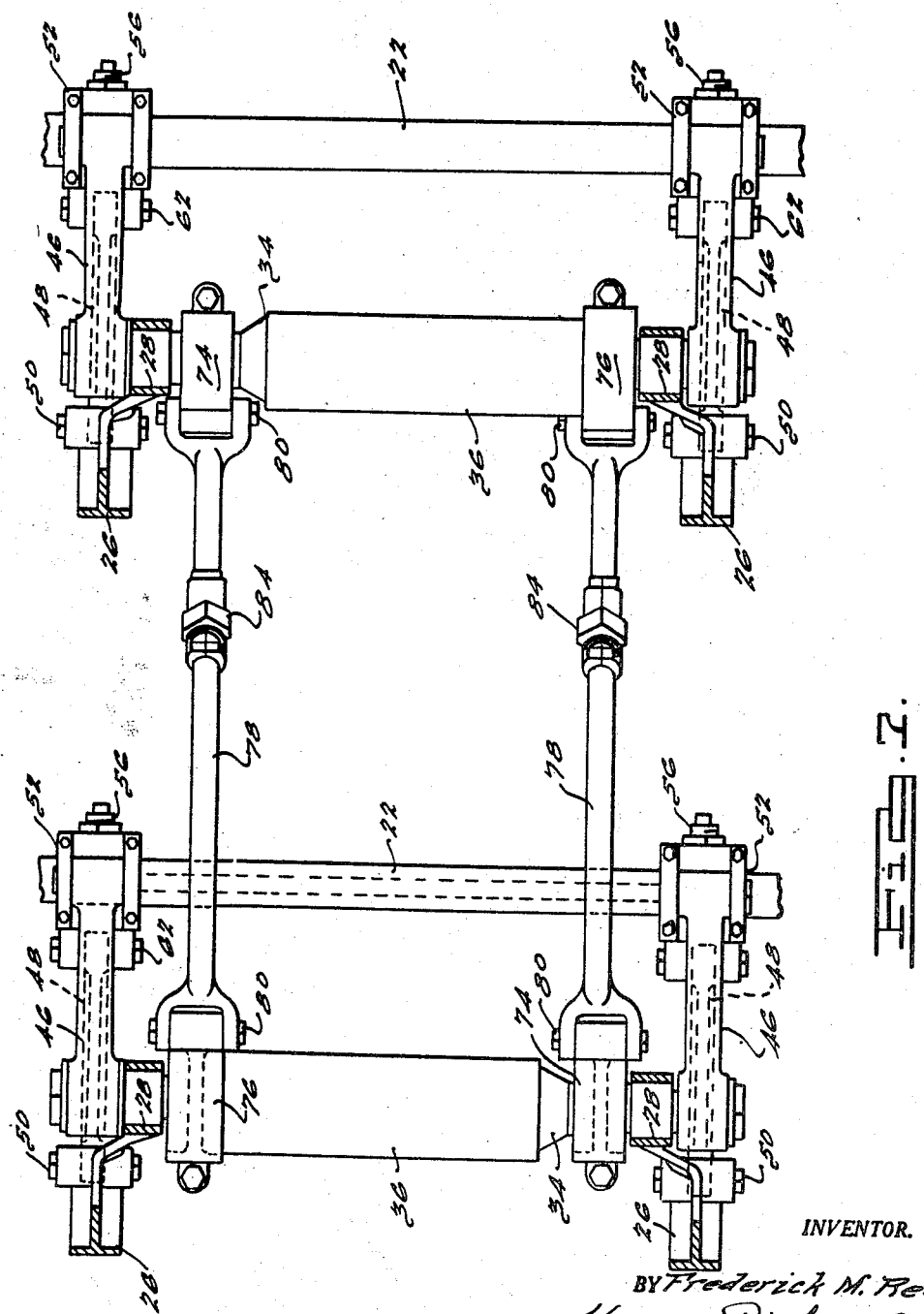

2,410,747

UNITED STATES PATENT OFFICE 2,410,747

TANDEM AXLE VEHICLE

Frederick M. Reid, Detroit, Mich., assignor to Fruehauf Trailer Company, Detroit, Mich., a corporation of Michigan Application September 24, 1945, Serial No. 618,201

12 Claims. (Cl. 280—104.5)

This invention relates to tandem axle vehicles and particularly to a so-called "spring suspension" therefor, the principal object being the provision of a simple and effective structure for springing one end of a tandem axle vehicle.

Objects of the invention include the provision a suspension for a tandem axle vehicle including parallel crank arms for guiding both axles in their vertical movement and serving to maintain the axles in exact parallelism irrespective of load yield; the provision of a suspension of the type described in which the yielding elements consist of rubber or the like mounted between the walls of concentric tubular members, the rubber elements being so constructed and arranged as to yieldably support the load and yield under torsional shear forces without any change in the shape or volume; the provision of the construction above described in which at least one of the tubular members to which the rubber or the equivalent is bonded, extends transversely of the chassis within the lateral width of the chassis and functions as a cross tie member for the chassis; the provision of a construction of the above described type in which the concentric tubes and the embraced body of rubber or the like function as the pivot members for the crank arms as well as the shock absorbing elements of the suspension; the provision of the construction as above described in which the yielding elements serve as pivot bearings for the load equalizing the lever arms of the suspension; the provision of a construction as above described in which the levers or load carrying arms for each axle extend rearwardly in approximately the plane of the corresponding side frame members of the chassis, and are carried by the inner of the tubular members corresponding with such axle; the provision of a construction as above described in which one pair of concentric tubular members is provided in advance of each of the axles, the parallel crank arms extending in a generally rearward direction from both ends thereof and at least one of the crank arms being fixed against rotation to one of the tubular members; the provision of a construction as above described in which both the inner and outer members of each pair of concentric tubular members is each provided with a lever arm fixed thereto, the lever arm fixed to the particular one of the pair of concentric members for one axle being connected by a tension rod to the lever arm fixed with respect to the other of the concentric tubular members for the other axle; the provision of a construction as above described in which the length of the tension rods may be adjusted whereby to permit vertical adjustment of the axles with respect to the frame to compensate for initial rubber creep, or for equalizing or adjusting the height of one or both sides of the chassis without effecting the parallelism of the axles; the provision of a construction as above described in which the load carrying crank arms are located directly below the chassis frame, thereby permitting the use of wider frames with the same lateral dimension limitations between wheels as in conventional constructions, and also providing positive stops for limiting vertical travel of the axles, thereby also limiting torsional stress and bond stress in the yielding elements; the provision of a structure as above described in which the load carrying lever arms are disposed a substantial distance vertically above the wheel centerlines and radius rods are provided below the centerlines of the wheels to provide adequately spaced reaction points for resistance of wheel torque due to braking or driving; the provision of a construction as above described in which a longitudinal pivot connection is interposed between the load carrying arms and the axles to compensate for unequal vertical displacement of the two wheels on the opposite ends of an axle; the provision of a construction as above described including a novel means for adjusting the fore and aft position of the axles to enable them to be initially brought into absolute parallelism and to be maintained in such position; and the provision of a construction as above described in which the yielding rubber or the like elements is sealed for protection against deteriorating elements such as light, air, grease or the like and not subject to any frictional abrasion or rubbing contact with other parts.

The above being among the objects of the present invention, the same consists in certain novel features of construction and combinations of parts to be hereinafter described with reference to the accompanying drawings, and then claimed, having the above and other objects in view.

In the accompanying drawings which illustrate a suitable embodiment of the present invention and in which like numerals refer to like parts throughout the several different views, Fig. 1 is a side elevational view of a trailer type of vehicle equipped with tandem axles supporting the rear end thereof, such axles being connected to the frame of the trailer by a suspension mechanism constructed in accordance with the present invention;

Fig. 2 is an enlarged, partially broken, partially sectioned side elevational view of the suspension mechanism shown on the vehicle of Fig. 1, the section being taken for the most part in a vertical plane immediately inwardly of the near wheels of Fig. 1;

Fig. 3 is an enlarged vertical sectional view taken transversely of the vehicles on the line 3—3 of Fig. 2;

Fig. 4 is an enlarged vertical sectional view taken transversely of the vehicle as on the line 4—4 of Fig. 2;

Fig. 5 is a transverse sectional view taken on the line 5—5 of Fig. 4.

Fig. 6 is a partially broken, partially sectioned, partial rear view of the structure shown in the preceding views; and Fig. 7 is a plan view of the suspension mechanism with the frame and certain other parts broken away to better bring out the arrangement and connections between the various parts.

The present invention deals with the suspension of an end of a vehicle through tandem axles and by a form of suspension mechanism that is simple in construction, efficient in operation and economical to build. It embodies tubes of rubber or like yieldable material through which the body of the vehicle is sprung from the axles. The invention is equally applicable to vehicles employing either driving or dead types of axles but for the purpose of simplicity in description it is shown in the accompanying drawings in connection with the latter type of axles applied to a trailer vehicle. Those skilled in the art will appreciate the manner in which driving types of axles may be substituted for the dead axles shown in adapting the invention to driven types of vehicles. Obviously, the invention may be applied to those types of vehicles having tandem axles, one of which is a driving axle and the other of which is a dead or non-driving axle.

Referring now to the accompanying drawings, in Fig. 1 is illustrated a vehicle of the trailer type having a frame 10 and a body 12. The rear end of the body is supported by ground wheels 14, each of which is equipped with dual tires 16 as shown in Fig. 6. The front end of the vehicle is shown disconnected from a tractor and self-supported through a conventional supporting leg structure 18 and wheels 20.

The wheels 14 are rotatably mounted in a conventional manner upon the opposite ends of a pair of dead axles 22. These axles, as best brought out in Fig. 2, are of I-beam section over the greater part of their length and are arranged below the frame 10, transverse to the length of the latter and in parallelism with respect to each other. It is the connection between the axles 22 and the frame 10 that constitutes the gist of the present invention.

As best brought out in Fig. 2, in order to support the axles 22 from the frame 10, there is secured to each frame side member 24 in forwardly spaced relation with respect to each axle 22 a downwardly extending bracket 26, shown in the form of a casting and rigidly secured to the corresponding frame side members 24 by riveting or the like. These brackets 26 are of generally V-like conformation in side elevation and have their central portions depressed inwardly towards the centerline of the frame. Each bracket 26 on its rear face and between its upper and lower limits is provided with a semi-circular recess 28 which co-operates with a removable cap 30 to provide a cylindrical seat for a bearing bushing 32 as brought out in Figs. 3 and 4. The bearing bushings 32 for each transversely aligned pair of brackets 26 are arranged in concentric and aligned relation with respect to each other. Rotatably received between each aligned pair of bearing bushings 32 is a metal tube 34, one end of such tube being directly received by the corresponding bushing 32 and the opposite end indirectly, as will hereinafter be more fully explained. Surrounding each tube 34 in radially spaced and concentric relation with respect thereto is another tube 36. The space between each co-operating pair of tubes 34 and 36 is filled with rubber 38 or equivalent yielding material vulcanized or otherwise suitably bonded to the opposed surfaces of the tubes 34 and 36. Each tube 36, as best brought out in Fig. 5, is preferably made in two halves, the free edges of which are outwardly flanged as at 40 and secured in flat contacting relationship with respect to each other as shown, this facilitating the non-rotatable securement of certain levers thereto as shown in Fig. 5.

A load-carrying arm or lever 46 is supported on each outer end of each tube 34 and extends in a generally rearward direction therefrom. Likewise, a radius rod 48 is pivotally connected at 50 to the lower end of each bracket 26 and extends in a generally rearwardly direction therefrom immediately below each lever 46. In longitudinal alignment with each load-carrying lever 46 and its corresponding radius rod 48 is a frame-like connecting member 52 which embraces the corresponding end of the corresponding axle 22.

The members 52 themselves are generally spaced from the axle which they embrace and are secured to the axle in the manner illustrated at right hand side of Fig. 2. As there shown, the axle 22 at the point where a member 52 embraces it, is of generally solid rectangular conformation and is provided with a generally horizontal hole or bore 52' therethrough centrally between the upper and lower faces of such axle and arranged with its axis longitudinally of the vehicle. The last mentioned opening 52' in each member 22 receives a pin 54 therein, preferably with a press fit, the pin 54 projecting forwardly and rearwardly from such axle. The forward and rear walls of the member 52 are provided with aligned openings therethrough intermediate the upper and lower walls of the member 52 and in each of which openings is threadably received an abutment member 56. The abutment members 56 are provided with a bore in which is received a bearing bushing 58 in which the opposite ends of the pin 54 are rotatably received. The axially inner ends of the abutment members 56 are outwardly flanged for flat contacting relationship with respect to the corresponding faces of the cooperating axle 22.

Each member 52 is connected at its upper end, above the center of the corresponding wheel 14, by a pin 60 to the free rear end of the corresponding load carrying lever arm 46, and the free rear end of each radius rod 48 is connected by means of a pin 62 with the lower end of the corresponding member 52 below the center of the corresponding wheel, the pivot pins 60 and 62 being arranged with their axes parallel and parallel with the axes of the corresponding pin 50 and tube 34 so as to provide unrestricted pivotal movement of the lever 46 and radius rod 48. Likewise, the distance between the axes of each pin 60 and the corresponding tube 34 is the same as the distance between the axes of the pins 62 and 50, so as to connect the end of the axle received by each member 52 by a parallel motion mechanism to the vehicle frame 10.

It will be appreciated that by threading the abutment members 56 in either one direction or the other the distance between the end of the corresponding axle received in any frame member 52 with respect to a plane including the axes of the corresponding tube 34 and pivot pin 50 may be varied, and by such adjustment the axles 22 may be adjusted into perfect parallelism with each other and into perpendicular relationship with respect to the longitudinal centerline of the frame 10. When the adjustment is made the members 56 are locked in their adjusted position by means of lock nuts 64. It will be noted that because the pins 54 are rotatably mounted in their corresponding abutment members 56, a pivotal connection about a longitudinally extending line is provided between each end of each axle 22 and corresponding frame-like member 52 so as to relieve the corresponding load carrying arms 46 and radius rods 48 from any twisting strains due to the lifting of one end of an axle relative to the opposite end in passing over road irregularities.

In order to utilize the rubber or the like 38 as a means for resisting relative movement of the free ends of the various load-carrying arms 46 upwardly towards the frame 10 under the vehicle load, the following mechanism is provided. As best brought out in Figs. 3 and 4, the hub of the forward left hand load-carrying arm 46, as viewed from the rear of the vehicle, and the hub of the right rear load carrying arm 46, are inwardly extended as at 70 in rotatably surrounding and supporting relationship with respect to the corresponding tube 34. Each such extension 70 is rotatably received within the bearing bushing 28 of the corresponding bracket 26, thus spacing the corresponding end of the tube 34 from direct contact with such bearing bushing. The inner end of the extension 70 of each of the two load-carrying arms 46, thus described, is formed integrally or otherwise fixed to the hub 72 of a lever 74 which is therefore also rotatably mounted with respect to the corresponding end of the corresponding inner tube 34. The lever 74 for the forwardmost of the two load-carrying arms 46 mentioned projects upwardly as shown in Fig. 3, while the arm 74 for the rearwardmost of the two mentioned arms 46 extends downwardly as shown in Fig. 4.

Fixed to the right hand end of the outer tube 36 for the forward axle 22 is an upwardly extending arm or lever 76 and an identical lever 76 is fixed to the left hand end of the outer tube 36 for the rear axle 22, but extends downwardly therefrom. The free end of this last mentioned arm or lever is connected by a tension rod 78 with the free end of the upwardly extending lever 74 on the forward tube 34, by means of pivot pins 80 and the tension rod itself is adjustable in length by means of a turn-buckle mechanism 48 of conventional construction. Another tension rod 78, identical with the one just described, is pivotally connected by pivot pins 80 between the lower free end of the rearmost arm or lever 74 and the upper free end of the forwardmost arm or lever 76. The right front load carrying arm or lever 46 and the left rear load carrying arm 46 are both non-rotatably secured to the corresponding ends of the corresponding tubes 34, as by means of a splined connection, and secured against withdrawal from their respective tubes 34 by means of locknuts 82.

With the above described construction it will be appreciated that the outer ends of the axles 22 on each side of the vehicle are connected together through the corresponding load-carrying arms 46, a pair of arms 74 and 76 extending in opposite directions from their pivotal axes and interconnected by the corresponding tension rod 78, and through one of the rubber sleeves 38. In the case of the ends of the axles at the left hand side of the vehicle, the connection is through the body of rubber 38 between the rear pair of concentric tubes 34 and 36, and for the ends of the axles 22 on the right hand side of the vehicle through the body of rubber 38 between the forward pair of concentric tubes 34 and 36. Any tendency of a wheel on one side of the vehicle to lift thus reacts through the above described connections on the same side of the vehicle to depress the other wheel on the same side of the vehicle. Thus the loads on the wheels on the same side of the vehicle act in opposition to each other through the corresponding rubber sleeve 38 and torsional yielding of such rubber sleeve due to variations in load transmitted through it provides the desired springing movements of the axles with respect to the frame. Obviously, the arrangement is such that the load on the two wheels on the same side of the vehicle is always equal and it will also be appreciated that movement on one wheel vertically with respect to another, due to road irregularities, will not affect the equal distribution of load to the two wheels on the same side of the vehicle.

The amount which the rubber sleeves 38 yield is of course so proportioned in each instance, depending upon the weight of the vehicle body and the load intended to be carried thereby, as to provide the desired springing movement between the wheels and the frame. The equalizing stress between the various wheels on each side of the vehicle is always transmitted through a tension rod 78 which always maintains under tension by the load and is therefore not subject to buckling stresses. Furthermore, because of the pivotal connection afforded between the ends of the axles 22 and the ends of the load-carrying arms 46 through the longitudinal pivot pins 54, the load-carrying arms 46 and the radius rods 48 are entirely relieved of torsional stresses.

By positioning the load-carrying arms 46 immediately below the frame side members 24, instead of outwardly of the frame side members as in constructions employing conventional springs, it permits the use of wider frames with the same lateral dimensional limitations between the wheels than in conventional constructions. Additionally, by judiciously arranging the vertical positions of the arms 46 with respect to the frame side members 24, the frame side members 24 provide a means for limiting the springing movement of the load-carrying arms 46 beyond a point which might prove detrimental to rubber sleeves 38 and their bond with the tubes 34 and 36. The provision of bumpers 90, preferably formed from rubber or the like, on the lower faces of the frame side members 24 in a position to engage the load-carrying arms 46 at the limit of their desirable maximum load-carrying position provides a simple and effective means for cushioning the movement of load-carrying arms at their position of maximum deflection. It will be noted that the construction provided is in reality quite simple and relatively economical to manufacture. This last is particularly true in view of the fact that each assembly comprising a pair of tubes 34 and 36 with interposed body rubber 38, and corresponding lever 76, is identical with the other, one being simply turned end for end with respect to the other and rotated through 180 degrees, therefrom. Likewise, in initially assembling the suspension mechanism to the frame of the vehicle, the various abutment members 56 may be adjusted to shift the axles 22 to bring them into absolute parallelism with each other and perpendicular to the longitudinal centerline of the vehicle, and the turn buckles 84 may be adjusted to insure both sides of the vehicle being supported at the same distance from the ground and at a no-load position having the desired clearance between the free ends of the arms 46 and the frame side members 24. Additionally, the turn buckles 84 provide a means by which the creep which inevitably occurs in the sleeves 38 in service and particularly during initial operation of the vehicle, may be compensated for. Furthermore, in view of the fact that both ends of each axle 22 are connected to the frame through a parallel linkage mechanism, connected thereto both above and below the wheel centers, the driving and/or braking reaction applied to the axles through the wheels is effectively resisted. Another point that will be appreciated by those skilled in the art is that because the tubes 34 are of material diameter and rigidity and are journaled at their opposite ends in the brackets 26 which are rigid with respect to the frame side members 24, they serve in the nature of frame cross members adding to the rigidity of the frame structure itself.

Having thus described my invention, what I claim by Letters Patent is:

1. In combination with a vehicle having a frame and a pair of parallel axles spaced longitudinally of the vehicle from each other and extending transversely of the length of such vehicle, a lever connected at one end to the outer end portion of each of said axles and extending forwardly therefrom, means pivotally mounting the forward ends of each of said levers with respect to said frame about axes parallel with said axles, an arm secured relative to one of said levers on each side of said vehicle and projecting upwardly therefrom, a second arm secured with respect to the remaining lever on each side of said vehicle and projecting downwardly therefrom, a tension rod interconnecting the free ends of said arms on the same side of said vehicle and a torsionally yieldable element interposed between one of said levers on each side of vehicle and the corresponding of said arms.

2. In combination with a vehicle having a frame and a pair of parallel axles spaced longitudinally of the vehicle from each other and extending transversely of the length of such vehicle, a lever connected at one end to the outer end portion of each of said axles and extending forwardly therefrom, means pivotally mounting the forward end of each of said levers with respect to said frame about an axis parallel with said axles, an arm secured relative to one of said levers on each side of said vehicle and projecting upwardly therefrom, a second arm secured with respect to the remaining lever on each side of said vehicle and projecting downwardly therefrom, a tension rod interconnecting the free ends of said arms on the same side of said vehicle, and a torsionally yieldable element interposed between one of said levers on each side of vehicle and the corresponding of said arms, said torsionally yieldable element comprising a tubular body of rubber-like material.

3. In combination with a vehicle having a frame and a pair of parallel axles spaced longitudinally of the vehicle from each other and extending transversely of the length of such vehicle, a lever connected at one end to the outer end portion of each of said axles and extending forwardly therefrom, means pivotally mounting the forward end of each of said levers with respect to said frame about an axis parallel with said axles, an arm secured relative to one of said levers on each side of said vehicle and projecting upwardly therefrom, a second arm secured with respect to the remaining lever on each side of said vehicle and projecting downwardly therefrom, a tension rod interconnecting the free ends of said arms on the same side of said vehicle, the connection between one of said levers on each side of said vehicle and the corresponding of said arms including a tube, a concentric cylindrical member therein arranged in radially spaced relation with respect thereto and a body of rubber-like material interposed between said tube and said cylindrical member and bonded to both thereof.

4. In combination with a vehicle having a frame and a pair of axles extending transversely with respect to the length of said frame and spaced from each other longitudinally of said frame, a lever connected at one end to the outer end portion of each said axle and extending forwardly with respect to said frame therefrom, the opposite ends of said levers each being mounted for pivotal movement about an axis fixed with respect to said frame and extending transversely of the length thereof, an arm fixed with respect to one of said levers on each side of said vehicle, an arm connected to the other of said levers on each side of said vehicle, a torsionally yieldable sleeve in each of the last mentioned connections, one of said arms on each side of said vehicle projecting upwardly and the other thereof projecting downwardly, and a tension rod interconnecting the free ends of said arms on each side of said vehicle.

5. In a vehicle of the class wherein there is a longitudinally extending frame and a pair of parallel transversely extending axles are provided under an end of said frame and spaced from each other longitudinally of said vehicle, the combination with said frame and axles of a parallel motion mechanism connecting each outer end portion of each of said axles with said frame, each of said mechanisms comprising a lever and radius rod each pivotally connected at one end to the corresponding outer end portion of the corresponding of said axles about vertically spaced parallel axes extending transversely of said vehicle and pivotally connected at their opposite ends to said frame about vertically spaced axes parallel to the first mentioned axes, an arm operatively connected to each of said levers, one of said arms on each side of said vehicle projecting upwardly from the pivotal axis of the corresponding said lever and the remaining arm on each side said vehicle projecting downwardly from the axis of the corresponding said lever, a tension rod operatively interconnecting the free ends of said arms on each side of said vehicle, said connection between one of said arms on each side of said vehicle and the corresponding of said levers comprising a sleeve of rubber-like material concentric with the axis of rotation of said lever and serving to transmit the load acting through said tension rod through torsional resistance set up therein.

6. In a vehicle of a class wherein there is a longitudinally extending frame having side members and a pair of transversely extending parallel axles spaced longitudinally of the vehicle from one another under one end of said frame, the combination with said frame and axles of a circularly sectioned member extending transversely of said vehicle and rotatably mounted on said frame in advance of each of said axles, a lever non-rotatably secured to one end of each of said members and a lever rotatably mounted upon the opposite end of each of said members, one of the first mentioned and one of the last mentioned levers being arranged on each side of said vehicle and approximately directly below the corresponding side members of said frame, a tube surrounding each of said members in radially spaced relation with respect thereto, a body of rubber-like material interposed between each of said members and the surrounding said tube and bonded to each thereof, an arm fixed against rotation to each of said levers rotatably mounted with respect to said members, an arm fixed against rotation with respect to each of said tubes, one of the first mentioned pair of arms extending upwardly from the corresponding said member and the other thereof projecting downwardly from the corresponding said members, one of the last mentioned arms projecting upwardly from the corresponding said tube and the other end thereof projecting downwardly from the corresponding said tube, the said arms on the same side of said vehicle having their free ends innerconnected by a tension rod, and the free ends of said levers being connected to the corresponding ends of the corresponding of said axles, whereby the load transmitted between said frame and axles is resisted by torsion in said rubber-like bodies.

7. In a vehicle of a class wherein there is a longitudinally extending frame structure and a pair of transversely extending and longitudinally spaced axles under an end thereof, the combination with said frame and axles of a member connected to the outer end portion of each of said axles for pivotal movement about an axis extending generally longitudinally of said vehicle, a lever pivotally connected to each of said members for movement about an axis extending generally longitudinally of the corresponding of said axles, a circularly sectioned member rotatably supported by said frame in advance of each of said axles and extending transversely of the length of said vehicle, the forward end of one of said levers on each side of said vehicle being non-rotatably secured to the corresponding of said circularly sectioned member and the other of said levers on each side of said vehicle being rotatably secured to the corresponding of said circularly sectioned members, a tubular member surrounding each of said circularly sectioned members in radially spaced relation with respect thereto, a sleeve of rubber-like material interposed between each of said circularly sectioned members and the corresponding surrounding tube and bonded to both thereof, an arm non-rotatably secured to each of said levers rotatably mounted with respect to the corresponding of said circularly sectioned members, and an arm non-rotatably secured to each of said tubes, each of first mentioned arms being substantially aligned longitudinally of said vehicle with one of said last mentioned arms and projecting in opposite vertical directions from the axes of the corresponding of such circularly sectioned members and a tension rod interconnecting the free ends of the arms on each side of said vehicle.

8. In a vehicle of a class wherein there is a longitudinally extending frame structure and a pair of transversely extending and longitudinally spaced axles under an end thereof, the combination with said frame and axles of a member connected to the outer end portion of each of said axles for pivotal movement about an axis extending generally longitudinally of said vehicle, a lever pivotally connected to each of said members for movement about an axis extending generally longitudinally of the corresponding of said axles, a circularly sectioned member rotatably supported by said frame in advance of each of said axles and extending transversely of the length of said vehicle, the forward end of one of said levers on each side of said vehicle being non-rotatably secured to the corresponding of said circularly sectioned members and the other of said levers on each side of said vehicle being rotatably secured to the corresponding of said circularly sectioned members, a tubular member surrounding each of said circularly sectioned members in radially spaced relation with respect thereto, a sleeve of rubber-like material interposed between each of said circularly sectioned members and the corresponding surrounding tube and bonded to both thereof, an arm non-rotatably secured to each of said levers rotatably mounted with respect to the corresponding of said circularly sectioned members, and an arm non-rotatably secured to each of said tubes, each of first mentioned arms being substantially aligned longitudinally of said vehicle with one of said last mentioned arms and projecting in opposite vertical directions from the axes of the corresponding of such circularly sectioned members, the free ends of the arms on each side of said vehicle being interconnected by a tension rod, and means for varying the effective length of said tension rod whereby to enable the pivotal relation of said levers with respect to such frames to be varied at will.

9. In a vehicle of the class comprising a longitudinally extending frame structure and a transversely extending axle, the combination with said frame structure and axle of a member embracing the front and rear faces of each end of said axle in forwardly and rearwardly spaced relation with respect thereto, a longitudinally extending lever pivotally connected to each of said members for relative pivotal movement about a line extending generally longitudinally of said axle, each of said levers being pivotally connected at its forward end to said frame structure about an axis common to both said levers, means interconnecting the outer end portion of each end of said axle with corresponding of said members adjustable to vary the position of said end portions of said axle longitudinally of said vehicle, and means for resiliently resisting pivotal movement of said levers under the load imposed upon said axle from said frame structure through said levers.

10. In a vehicle of the class comprising a longitudinally extending frame structure and a transversely extending axle, the combination with said frame structure and axle of a member embracing the front and rear faces of each end of said axle in forwardly and rearwardly spaced relation with respect thereto, a longitudinally extending lever pivotally connected to each of said members for relative pivotal movement about a line extending generally longitudinally of said axle, each of said levers being pivotally connected at its forward end to said frame structure about an axis common to both said levers, means interconnecting the outer end portion of each end of said axle with corresponding of said members adjustable to vary the position of said end portions of said axle longitudinally of said vehicle comprising a pair of aligned members arranged with their axes longitudinally of said vehicle threaded through the forward and rear walls respectively of each said members, the axially inner ends of said members engaging the forward and rearward faces respectively of the corresponding end portions of said axle whereby to control the positions of said end portions longitudinally of said vehicle, and means for resiliently resisting pivotal movement of said levers under the load imposed upon said axle from said frame structure.

11. In a vehicle of the class including a longitudinally extending frame structure and a transversely extending axle, a pin projecting through each end of said axle and each arranged with its axis extending generally longitudinally of said vehicle, an externally threaded element rotatably mounted upon each of said pins and on opposite sides of said axle, a member extending over said axle in spaced relation to the forward and rearward faces thereof in which said elements are threadably received, a lever pivotally connected to each of said members about an axis extending generally transversely of said vehicle, means pivotally mounting the opposite end of each of said levers with respect to said frame structure, and resilient means resisting pivotal movement of said levers with respect to said frame under the load transmitted through them between said frame structure and said axle.

12. In a vehicle of the class wherein there is a frame structure extending longitudinally of the vehicle and an axle extending transversely thereof, means for connecting said axle to said frame structure comprising a bracket fixed to said frame structure in advance of each end portion of said axle, a member cooperating with each end portion of said axle and arranged in generally spaced relation with respect to the forward and rearward faces thereof, a longitudinally extending pin projecting through each end portion of said axle within the lateral width of each of said members, a pair of longitudinally aligned members one rotatably received on each end of each of said pins and threadably received by the corresponding forward and rearward walls of the corresponding of said members, a lever pivotally connected to each of said members above said axle for pivotal movement about an axis extending generally longitudinally of said axle, a radius rod pivotally connected to each of said members below said axle about an axis parallel to the axis of the first mentioned pivotal connection, the forward ends of said levers and radius rods being pivotally connected to the corresponding of said brackets about vertically spaced and parallel axes, the horizontal distance between the pivotal axes at opposite ends of both said levers and radius rods being substantially the same, and the pivotal connections between said levers and said radius rods with said members being vertically spaced from each other substantially the same distance as the vertical spacing of their pivotal connections with said brackets.

FREDERICK M. REID.